United States Patent [19]

Takano

[11] Patent Number: 5,655,844
[45] Date of Patent: Aug. 12, 1997

[54] ROLLING BEARING UNIT

[75] Inventor: Susumu Takano, Fujisawa, Japan

[73] Assignee: NSK LTD., Tokyo, Japan

[21] Appl. No.: 600,615

[22] Filed: Feb. 13, 1996

[30] Foreign Application Priority Data

Feb. 13, 1995 [JP] Japan .................................. 7-024364

[51] Int. Cl.⁶ .............................. F16C 19/54; F16C 33/58
[52] U.S. Cl. .......................... 384/453; 384/516; 384/615
[58] Field of Search ................................. 384/453, 504, 384/513, 514, 516, 615

[56] References Cited

U.S. PATENT DOCUMENTS

| 1,722,492 | 7/1929 | Brunner | 384/516 |
| 2,733,967 | 2/1956 | Jones, Jr. | 384/615 |

FOREIGN PATENT DOCUMENTS

| 2746151 | 4/1979 | Germany . |
| 54-12656 | 1/1979 | Japan . |
| 58-160621 | 9/1983 | Japan . |

OTHER PUBLICATIONS

RHP Precision high precision bearings, pp. 14, 15, and 82 (1987).
PUMPAC The MRC Bearing System No Date.
Rolling Bearing Analysis, Tedric A. Harris, pp. 246–253 (1966).
New Departure Engineering Service No Date.

*Primary Examiner*—Thomas R. Hannon
*Attorney, Agent, or Firm*—Evenson, McKeown, Edwards & Lenahan, P.L.L.C.

[57] ABSTRACT

In order to prevent a reduction in fatigue life and to improve the endurance of a rolling bearing unit which is made up by assembling a pair of angular type ball bearings 4, 5 so as to rotatably support an axial load applied in a substantially constant direction, provided that a radial load $F_r$ and a leftwise axial load $F_a$ are applied to a rotating shaft 2 during running, the contact angle $\alpha_1$ of the right hand side bearing 4 which takes the axial load $F_a$ is made large, while the contact angle $\alpha_2$ of the left hand side bearing 5 which takes no axial load is made small, and the left hand side bearing 5 has a slight positive bearing gap during running.

9 Claims, 3 Drawing Sheets

ROLLING BEARING UNIT

BACKGROUND OF THE INVENTION

1. Field of the Invention

The present invention relates to a rolling bearing unit used for example for rotatably supporting a rotating shaft of a screw compressor.

2. Description of the Related Art

In order to support the rotating shaft of a screw compressor and the like, a rolling bearing unit such as shown in FIG. 2 has heretofore been used. This bearing unit is provided between an outer peripheral face of a rotating shaft 2 to which is secured a rotor 1 of a screw compressor, and an inner peripheral face of a housing 3, and is made up by assembling together a pair of first and second ball bearings 4, 5 of the angular type. With the present example, the so-called back-to-back or double back face assembly (DS) is adopted.

The directions of the contact angles $\alpha_1$ the first and second ball bearings 4, 5 are made opposite to each other. Therefore, when the rotating shaft 2 is displaced towards the left in FIG. 2, the first ball bearing 4 on the right hand side in FIG. 2 supports the load in the axial direction (axial load), while when displaced to the right, the second ball bearing 5 on the left hand side supports the axial load, thus preventing displacement of the rotating shaft 2 and the rotor 1 relative to the housing 3.

With the rotating shaft 2 of the screw compressor in FIG. 2 however, an axial load $F_a$ is applied mainly in a direction as indicated by an arrow (left direction of FIG. 2) while a small axial load is only occasionally applied an the opposite direction. Consequently, if a pair of first and second ball bearings 4, 5 produced according to the same specification with respect to contact angle etc. are used with only the direction of the contact angles $\alpha_1$ opposite to each other, then the life of the overall ball bearing unit is inadequate. The reason for this is as follows.

Due to the axial load $F_a$ applied in the one direction as mentioned above, the rigidity of the first ball bearing 4 on the side for Supporting the axial load $F_a$ (the right hand side in FIG. 2) is increased, while the rigidity of the second ball bearing 5 on the side which does not support the axial load $F_a$ (the left hand side in FIG. 2) is reduced. Accordingly, the result of applying the axial load $F_a$ to the first ball bearing 4, is to increase the Hertzian contact ellipse occurring at the contact regions between the rolling faces of the balls 6 of the first ball hearing 4 and the inner ring raceway on outer peripheral face of the inner ring 7 and between the rolling faces of the bells 6 of the first ball bearing 4 and the outer ring raceway on the inner peripheral face of the outer ring 8. The result of this larger contact ellipse being produced in the first ball bearing 4 on the side which carries the axial load $F_a$ (referred to hereunder sometimes as the axially loaded ball bearing 4), is to increase the rigidity of the first ball beating 4. FIG. 3 shows a general tendency of the relation between the size of an axial load $F_a$ acting on an angular type ball bearing, and the radial rigidity of the ball bearing. As is clear from FIG. 3, the radial rigidity of the first ball bearing 4 is expected to increase during operation of the screw compressor.

On the other hand, in the second ball bearing 5 which does not support the axial load $F_a$, a contact ellipse is not produced in the case of no preload applied, or even if produced in the case of a preload applied, to is only small. As a result, the radial rigidity of the ball bearing 5 which does not support the axial load $F_a$ (referred to hereunder sometimes as the non axially loaded ball bearing 5) is less. Consequently, the majority of the radial load $F_r$ applied between the rotating shaft 2 and the housing 3 is supported by the first ball bearing or axially loaded ball bearing 4, while the second ball bearing 5 not only does not support the axial load $F_a$ but also provides only minimal support for the radial load $F_r$. As a result, the load on the axially loaded ball bearing 4 is much larger than that on the non axially loaded ball bearing 5.

The life of the overall rolling bearing unit made up by assembling together the pair of first and second ball bearings 4, 5, is predominantly influenced by the shorter life one out of the pair of first and second ball bearings 4, 5. In the case where, as shown in FIG. 2, only the first ball bearing 4 is subjected to a large load while the load applied to the second ball bearing 5 is extremely small provided that the first and second ball bearings 4, 5 are made according to the same specification, then the life for the overall ball bearing unit is predominantly influenced by the life of the first ball bearing 4. Moreover, since the life of the first ball bearing 4 will not be sufficiently long, then the life for the overall rolling bearing unit becomes inadequate.

In view of this situation, there have heretofore been various attempts to extend the life of the rolling bearing unit fitted for example to a screw compressor. A first arrangement has been carried out wherein a positive gap or actual gap (in contrast to a negative gap under preload conditions) is provided rather than a preload being applied to the pair of ball bearings of the rolling bearing unit. When a positive or actual gap is provided in this way, then the contact pressure on the rolling faces of the balls and on the inner and outer raceways of the respective ball bearings is smaller than that for the case of a preload applied, so that the fatigue life of the rolling faces, as well as that of the inner and outer ring raceways is improved.

In the case of a rolling bearing unit assembled for example into a screw compressor and the like, which differs from a bearing unit where a preload is required to meet the demand for high rotational accuracy as with bearing units used for the shaft of a machine tool, a positive gap is applied between the respective ball bearings to thereby reduce the amount of heating during operation and thus improve the fatigue life.

With the construction example shown An FIG. 4, a portion of the housing 3 opposite to the outer ring 8 of the axially loaded ball bearing 4 is formed with a larger diameter so that a gap 9 exists between the outer peripheral face of the outer ring 8 and the inner peripheral face of the housing 3. Therefore, with this construction example, the radial load $F_r$ applied between the rotating shaft 2 and the housing 3 is supported only by the non axially loaded ball bearing 5.

With the construction example shown in FIG. 5 which is disclosed in Japanese Patent First Publication KOKAI No. S58160621, there is a change in addition to the construction shown in FIG. 4, Specifically, the contact angle $\alpha_2$ of the non axially loaded ball bearing 5 is made smaller than the contact angle $\alpha_1$ of the axially loaded ball bearing 4 ($\alpha_1 > \alpha_2$). By making the contact angle $\alpha_2$ of the non axially loaded ball bearing 5 smaller as with this construction example, the load capacity with respect to the radial load $F_r$ of the non axially loaded ball bearing 5 is increased.

With the abovementioned conventional constructions, however, a sufficient improvement in life is not always possible.

At first, in the case of the construction shown in FIG. 2 wherein the first and second ball bearings 4, 5 made according to the same specification are engagingly supported in the same manner between the outer peripheral face of the rotating shaft 2 and the inner peripheral face of the housing 3, then as mentioned before, the load on the first ball bearing or axially loaded ball bearing 4 is much greater than that on the second ball bearing or non axially loaded ball bearing 5, so that the life is shortened. Moreover in the case wherein a positive gap is provided inside the respective ball bearings 4 and 5, the life is improved compared to the case where a preload or a negative gap is provided. However from the viewpoint of the increase in load on the axially loaded ball bearing 4, this case is basically the same as for the preload case, and hence obtaining sufficient life improvement is difficult.

With the construction as shown in FIG. 4 wherein the radial load $F_r$ is not supported by the first ball bearing or axially loaded ball beating 4, since all of the radial load $F_r$ applied to the second ball bearing or non axially loaded ball bearing 5, then the fatigue life of the second ball bearing 5 tends to be inadequate. Furthermore, as a result of applying all the radial load $F_r$ to the second ball bearing 5, an internal axial load in the opposite direction to the axial load $F_a$ is produced in the second ball bearing 5. This internal axial load is applied together with the axial load $F_a$ to the first ball bearing 4, thus further increasing the axial load applied thereto, so that the fatigue life of the first ball bearing 4 also tends to be inadequate.

With the construction example as shown in FIG. 5 wherein the contact angle $\alpha_2$ of the second ball bearing or non axially loaded ball bearing 5 is reduced, the load capacity with respect to the radial load of the second bell bearing 5 is increased so that the fatigue life of the second ball bearing 5 is improved to some degree. However considering that the radial load $F_r$ is supported by only the second ball bearing 5, then as with the construction example shown in FIG. 4, the fatigue life of the second ball bearing 5 tends to be inadequate. Moreover, although the internal axial load produced inside the second ball beating 5 is reduced with a reduction in the contact angle $\alpha_2$, this internal axial load is still produced so that the fatigue life of the first ball bearing or axially loaded ball bearing 4 still tends to be inadequate.

Therefore, in order to ensure sufficient life of the rolling bearing unit, countermeasures such as increasing the size of the first and second bearings 4, 5, or using a high quality material for the bearings have heretofore been devised. However, with such countermeasures, the cost of the rolling bearing unit is increased, resulting in an increase in the cost of mechanical equipment such as screw compressors to which the rolling bearing unit is fitted.

Furthermore, in Japanese Patent First Publication KOKAI No. H5-280482 there is disclosed a rolling bearing unit where, in order to suppress the increase in internal axial load due to centrifugal forces, the contact angle of the first ball bearing which supports the axial load is made 30 to 40 degrees, while the contact angle of the second ball bearing which does not support the axial load is made 15 to 25 degrees.

However, with the construction disclosed in this publication, there has been no consideration with regards to the internal gaps and to the support of the radial load. Hence the fatigue life extension effect is not really adequate.

SUMMARY OF THE INVENTION

The rolling bearing unit according to the present invention has been developed in view of the above situation.

An object of the present invention is to provide a rolling bearing unit comprising a shaft having an outer peripheral face, a housing having an inner peripheral face and a pair of first and second, angular type ball bearings provided between the outer peripheral face of the shaft end the inner peripheral face of the housing end having inner and outer rings respectively, the first ball bearing having a first contact angle, the second ball bearing having a second contact angle which is different in direction and amount from the first contact angle, the first ball supporting an axial load applied from outside in a predetermined direction between the shaft and the housing during operation, the inner rings securely fitted onto the outer peripheral face of the shaft, the outer rings securely fitted into the inner peripheral fade of the housing, the contact angle of the first ball bearing being larger than the contact angle of the second ball bearing, and the second ball bearing sized to have a small amount of positive gap produced inside during operation.

DETAILED DESCRIPTION OF THE PREFERRED EMBODIMENTS

Figure 1:
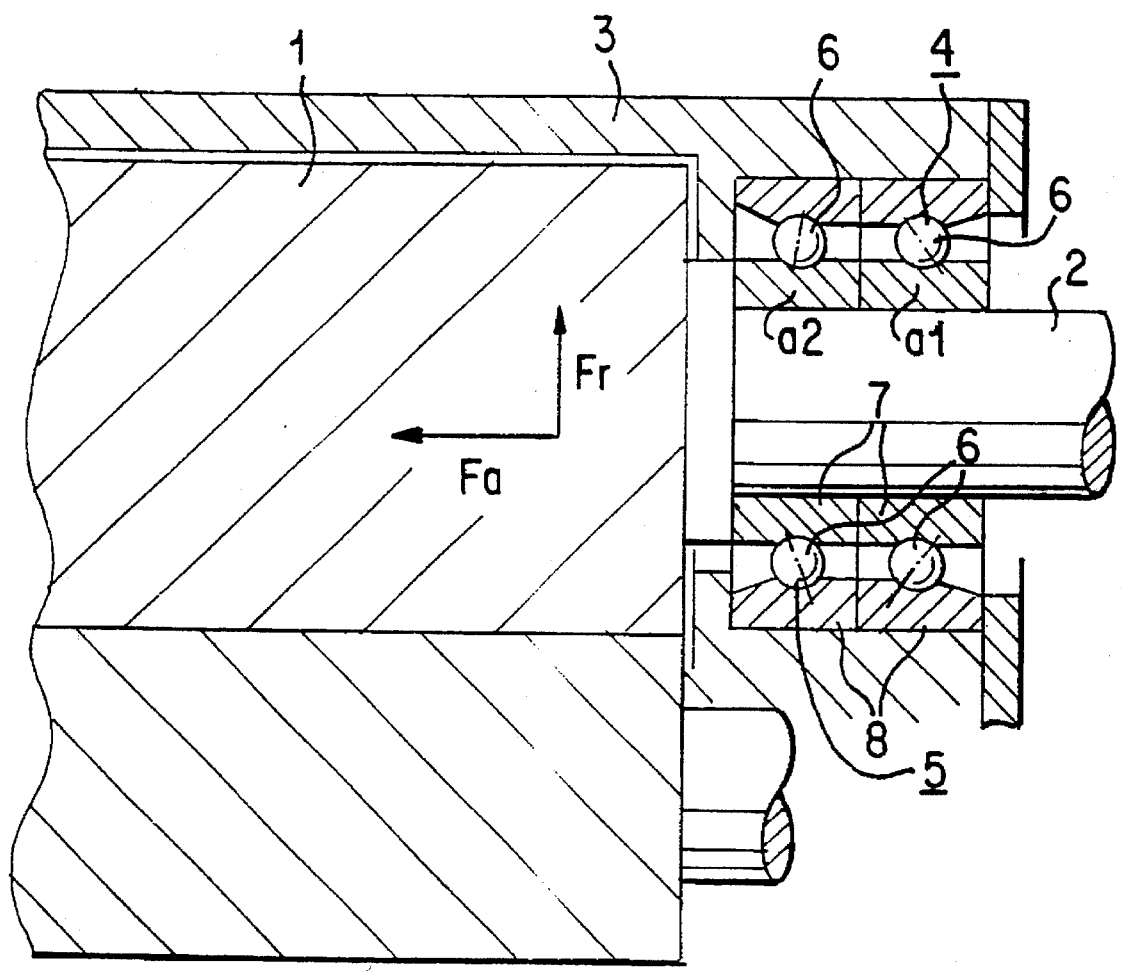
FIG. 1 is a cross-sectional view showing an embodiment of the press invention.
Figure 2:
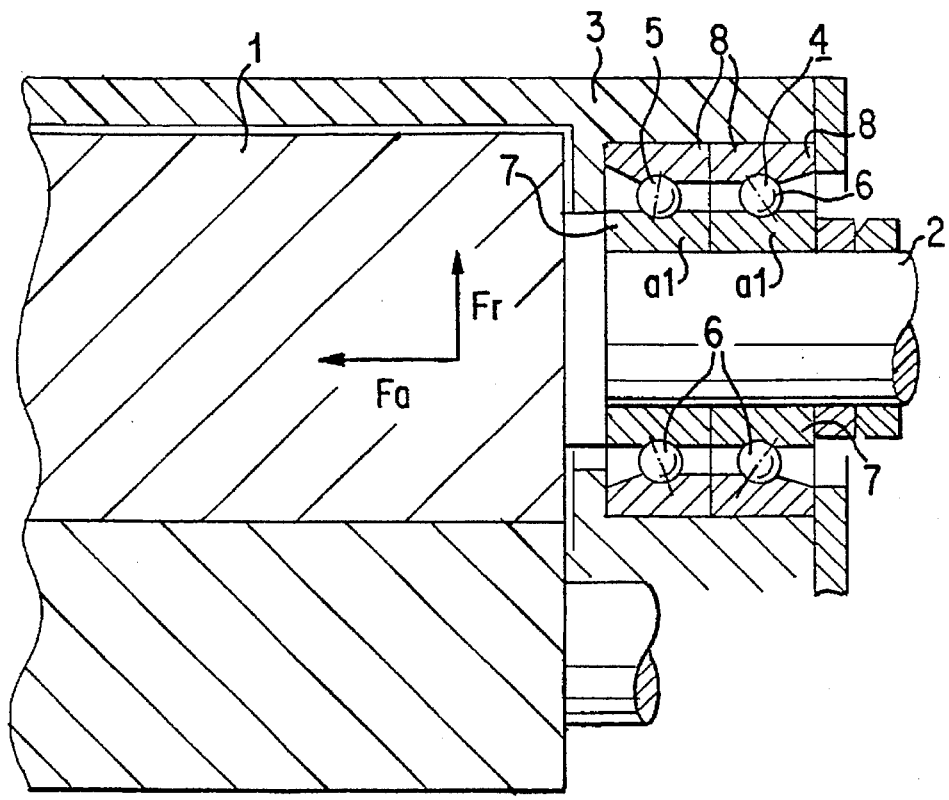
FIG. 2 is a cross-sectional view showing a first example of a conventional unit.
Figure 3:
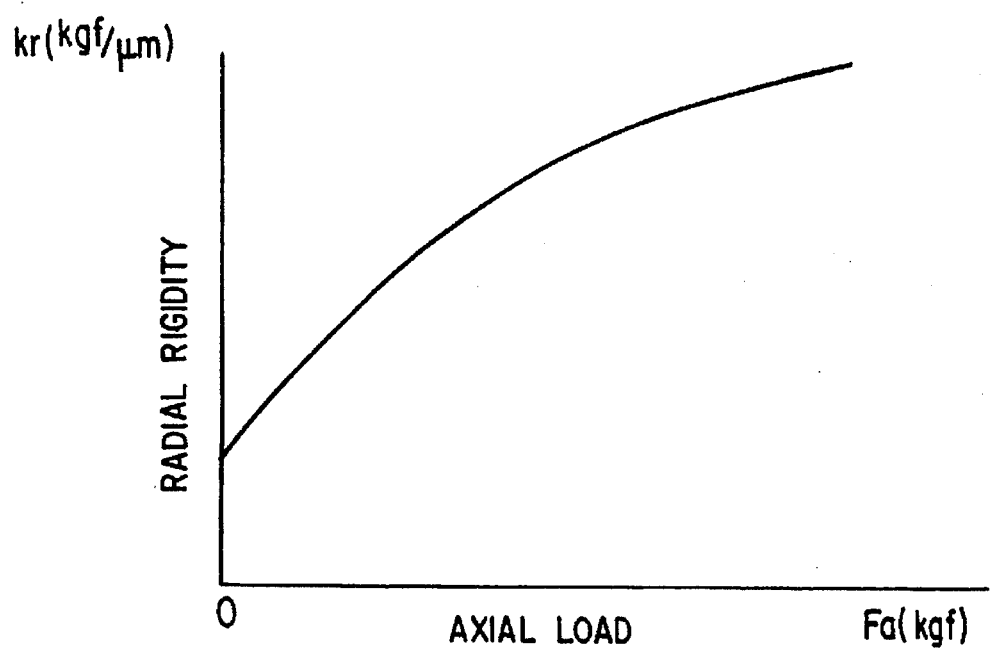
FIG. 3 is a graph showing a relationship between axial load and radial rigidity.
Figure 4:
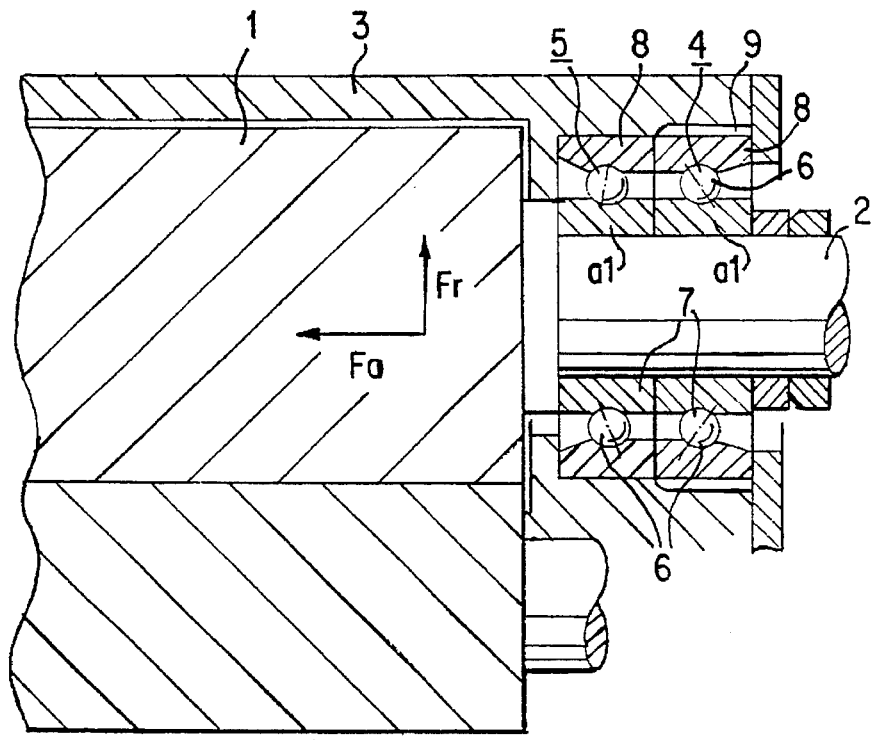
FIG. 4 is a cross-sectional view showing a second example of a conventional unit.

The rolling bearing unit according to the present invention, as with the beforementioned conventional rolling bearing units, has at least one pair of first and second ball bearings of the angular type provided between an outer peripheral face of a shaft and an inner peripheral face of a housing. The contact angles of the fist and second ball bearings are made different in direction from each other, so that during use an axial load applied in an approximately constant direction from outside is supported by the first ball bearing.

In particular, with the rolling bearing unit according to the present invention, the inner rings in the first and second ball bearings ere fixedly engaged with sufficient engagement strength to the outer peripheral face of the shaft, and similarly the outer rings in the first and second ball bearings are fixedly engaged with sufficient engagement strength to the inner peripheral face of the housing. Moreover, the contact angle of the first ball bearing is larger than the contact angle of the second ball bearing.

Preferably the contact angle of the first ball bearing within a range from 40 degrees to 55 degrees, while the contact angle of the second ball bearing is within a range from 15 degrees to 20 degrees.

Furthermore, in the second ball bearing, a slight positive gap exists inside during operation.

With the rolling bearing unit according to the present invention constructed as described above, the load capacity the first ball bearing which supports the axial load applied from outside during use is increased with the increase in contact angle of the bearing, so that a drop in fatigue life of the first ball bearing due to the axial load can be prevented. Moreover, with the second ball bearing having a smaller contact angle, the increase in internal axial load due to the radial load is suppressed. Consequently, the drop in the fatigue life of the first ball bearing due to the axial load can be kept small.

Furthermore, since the first ball bearing not only carries the axial load but also carries the radial load, then an excessive radial load is not applied to the second bell bearing, so that a drop in fatigue life of the second ball bearing can also be prevented. That is to say, with the reduction in the contact angle of the second ball bearing, the bearing rigidity in the radial direction becomes higher than that of the first ball bearing.

Therefore, in the case where the first and second ball bearings are used under the same conditions with regards to the radial direction as in the conventional constructions, then the second ball bearing supports the majority of the radial load, so that it is difficult due to the radial load to maintain the fatigue life of this second ball bearing.

It should be noted that in the case of the rolling bearing unit according to the present invention, by forming a slight positive gap inside the second ball bearing, then the first bell bearing also supports part of the radial load. More specifically, if the size of the positive gap is appropriately controlled according to the relationship with the contact angle of the first and second ball bearings as well as the axial load applied during operation, then the first and second ball bearings can uniformly carry the radial load, so that the drop in fatigue life of the second ball bearing due to the radial load can be minimized.

In this way, with the present invention, the fatigue life of both of the angular type ball bearings in the pair can be sufficiently maintained. Hence a drop in the rolling fatigue life of the overall rolling bearing unit made up by assembling the pair of first and second ball bearings, can be suppressed.

Now, FIG. 1 shows an embodiment of the present invention, where rolling bearing unit according to the present invention is assembled into a screw compressor. The rolling bearing unit of the present embodiment is constructed with a pair of first and second ball bearings 4, 5 of the angular type positioned back-to-back between an outer peripheral face of a rotating shaft 2 fixed to a rotor 1 of a screw compressor, and an inner peripheral face of a housing 3.

The inner rings 7 of the first and second ball bearings 4, 5 are externally secured with an interference fit to the rotating shaft 2, while the outer rings 8 are similarly internally secured with an interference fit to the housing 3.

During use of the screw compressor, a radial load $F_r$, as well as an axial load $F_a$ (to the left in FIG. 1) are applied to the rolling bearing unit from the rotating shaft 2. Consequently, the first ball bearing 4 (the right one in FIG. 1) of the rolling bearing unit, supports the axial load $F_a$, while the second ball bearing 5 (the left one in FIG. 5) does not support the axial load $F_a$.

Furthermore, the radial load $F_r$ is supported by both of the first and second ball bearings 4, 5.

The contact angle $\alpha_1$ of the first ball bearing 4 is made larger than the contact angle $\alpha_2$ of the second ball bearing 8 ($\alpha_1 > \alpha_2$). For example, in the case of the present embodiment, the contact angle $\alpha_1$ of the first ball bearing 4 is set to 40 degrees, while the contact angle $\alpha_2$ of the second ball bearing 5 is set to 15 degrees. Furthermore, with the second ball bearing 5, a slight positive gap exists inside during operation.

That is to say, when the axial load $F_a$ is applied with operation of the screw compressor, the balls 6 of the first ball bearing 4 are pressed strongly in the axial direction, while the balls 6 of the second ball bearing 5 are not pressed in the axial direction. However, when the radial load $F_r$ is applied, the balls 6 of the second ball bearing 5 are pressed in the radial direction, together with the balls 6 of the first ball bearing 4, to thereby support the radial load $F_r$.

With the rolling bearing unit according to the present invention constructed as described above, the contact angle $\alpha_1$ of the first ball bearing 4 which supports the axial load $F_a$ applied from outside during use, is the larger at 40 degrees, so that the load capacity of the first ball bearing 4 is larger. Hence the drop in fatigue life of the first ball bearing 4 due to the axial load $F_a$ can be prevented.

Moreover, the second ball bearing 5 has the smaller contact angle of 15 degrees, with a positive gap existing inside. Hence the increase in the internal axial load due to the radial load $F_r$ is suppressed. That is to say, due to the application of the radial load to the second bearing 5 of the angular type ball, an internal axial load in the opposite direction to the axial load $F_a$ is produced between the inner ring 7 and the outer ring 8 of the second ball bearing 5. However, with the smaller contact angle $\alpha_2$ of 15 degrees, this internal axial load is minimal. Consequently, the drop in the fatigue life of the first ball bearing 4 due Go the axial load can be kept small.

Furthermore, since the first ball bearing 4 not only carries the axial load $F_a$ but also carries the radial load $F_r$, then an excessive radial load is not applied to the second ball bearing 5, so that the drop in fatigue life of the second ball bearing 5 can also be prevented. That is to say, with the smaller contact angle $\alpha_2$ of 15 degrees in the second ball bearing 5, the bearing rigidity in the radial direction is higher than that of the first ball bearing 4, Therefore, in the conventional case where the pair of first and second ball bearings 4, 5 are used under the same conditions with regards to the radial direction, then the second ball bearing 8 supports the majority of the radial load. Under this condition, the contact pressure operational on the contact areas between the rolling faces of the balls 6 of the second ball bearing 5, and the inner ring raceway on the outer peripheral face of the inner ring 7 and between the rolling faces of the balls 6 of the second ball bearing 5 and the outer ring raceway on the inner peripheral face of the outer ring 8 is increased. Hence it becomes difficult to maintain the fatigue life of the second ball beating 5 due to the existence of the radial load $F_r$.

It should be noted that in the case of the rolling bearing unit according to the present invention, by forming a slight positive gap inside the second ball bearing 5, then the radial load $F_r$ is supported jointly by the first end second ball bearings 4, 5. That is to say, if the size of the positive gap is appropriately controlled according to the relationship between the contact angles $\alpha_1$, $\alpha_2$ of the bearings 4, 5 as well as the axial load $F_a$ applied during operation, then the first and second ball bearings 4, 5 can uniformly carry the radial load, so that the extent of the drop in fatigue life of the second ball bearing 5 due to the radial load $F_r$ can be minimized. In this way, with the present invention, the fatigue life of the pair of the first and second ball bearings 4, 5 of the angular type constituting the rolling bearing unit can be sufficiently maintained. Hence a drop in the rolling fatigue life of the overall rolling bearing unit made up by assembling the pair of ball bearings 4, 5, can be suppressed.

Next is a description of the results of life measurements carried out by the present inventor in order to verify the effects of the present invention.

For the first ball bearing 4 and second ball bearing 5, as a prerequisite for the measurements, two angular type ball bearings made by NSK LTD. and referred to as type 7306, with an inner diameter of 30 mm, an outer diameter of 72 mm, a width of 19 mm, and having 10 balls, were positioned in a back-to-back arrangement and run with the inner rings rotated at 3000 rpm. Both the axial load $F_a$ and the radial load $F_r$ were 200 kgf ($F_a=F_r=200$ kgf). The results are shown in the Table 1.

namely; 30 degrees, 40 degrees, 45 degrees, 50 degrees, 55 degrees, and 60 degrees. Furthermore, with the respective cases, the proportion ($L_0/L_1$) of the life $L_0$ for the case where for the contact angle $\alpha_2$ of the non axially loaded ball bearing 5 is made 15 degrees, relative to the life $L_1$ for the case where the contact angle $\alpha_2$ is made the same as that of the contact angle $\alpha_1$ of the axially loaded ball bearing 4 ($\alpha_1=\alpha_2$), is disclosed in Table 2 as a life ratio. The size, rotating conditions, and conditions such as the inner gap of

TABLE 1

| Type | | 1 | | 2 | | 3 | |
|---|---|---|---|---|---|---|---|
| | | Non-load side ($\alpha_2$) | Load side ($\alpha_1$) | Non-load side ($\alpha_2$) | Load side ($\alpha_1$) | Non-load side ($\alpha_2$) | Load side ($\alpha_1$) |
| Contact angle (degrees) | | 40 | 40 | 15 | 40 | 15 | 40 |
| Load share (kgf) | $F_r$ | 14.5 | 185.5 | 200 | 0 | 50.1 | 149.9 |
| | $F_a$ | 17.0 | 217.0 | 53.9 | 253.9 | 14.0 | 214.0 |
| | Each row (h) | 24121 | 21.4 | 22.2 | 77.1 | 1306 | 35.1 |
| RFL(*) | Total (h) | 21.4 | | 18.1 | | 34.5 | |
| | LR(**) | 1 | | 0.85 | | 1.6 | |

(*)RFL: Rolling Fatigue Life
(**)LR: Life Ratio

In Table 1, type 1 is a comparative example with the contact angles $\alpha_1$, $\alpha_2$ for the pair of ball bearings 4, 5 both set at 40 degrees.

Figure 5:
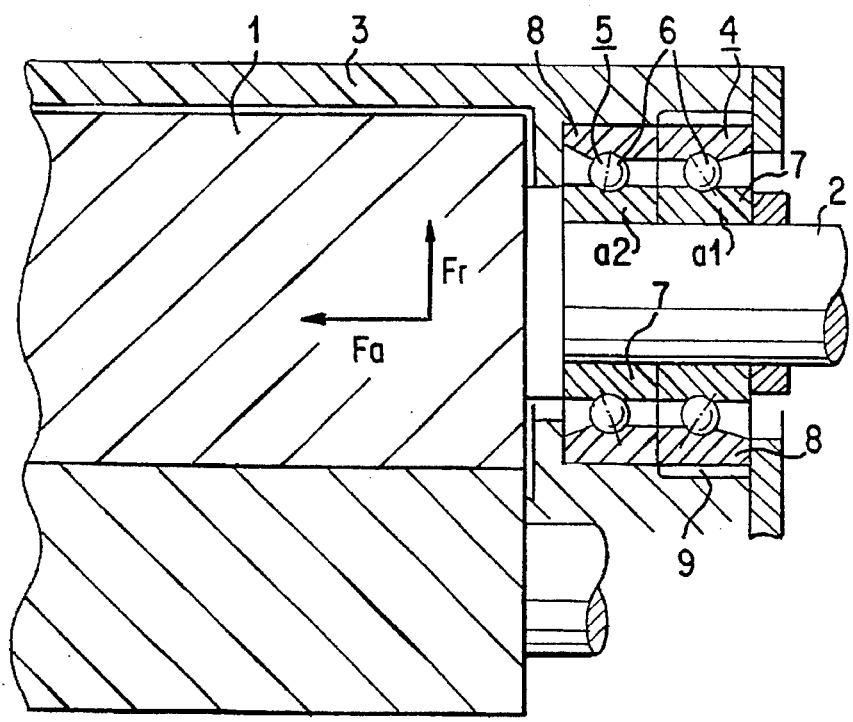
FIG. 5 is a cross-sectional view showing a third example of a conventional unit.

Type 2 is a comparative example having the construction shown in FIG. 5, With the contact angle $\alpha_1$ of the axially loaded ball bearing 4 set at 40 degrees, and the contact angle $\alpha_2$ of the non axially loaded ball bearing 5 set at 15 degrees, and a gap provided between the outer ring of the ball bearing 4 and the housing 3.

Moreover, type 3 is an example of the present invention, with the contact angle $\alpha_1$ of the axially loaded ball bearing 4 set at 40 degrees, and the contact angle $\alpha_2$ of the non axially loaded ball bearing 5 set at 15 degrees, and an assembly axial gap set at 0.010 mm provide a positive gap for the ball bearing 5.

The axial load ($F_a$) on the non-load side is an internal axial load. The axial load on the load side is the sum of the internal axial load and the external axial load.

As is apparent from the contents of Table 1, with the present invention the fatigue life of the first ball bearing 4 which supports the axial load $F_a$ applied from outside, and the fatigue life of the second ball bearing or non axially loaded ball bearing 5 are balanced, so that the life of the overall rolling bearing unit is sufficiently improved.

For example, with the type 3 construction of the embodiment of the present invention, the overall life is extended by 1.6 times that of the general conventional type 1 construction. On the other hand, in the case of type 2 as shown beforehand in FIG. 5, where the contact angles are changed and a gap is provided around the periphery of the outer ring Of the axially loaded ball bearing 4, the fatigue life of the non axially loaded ball bearing 5 is reduced due to the existence of the radial load $F_r$, so that the life of the Overall rolling bearing unit drops.

Table 2 shows the life of an overall rolling bearing unit for the case wherein the radial load $F_r$ is made 50 kgf, 67 kgf, 100 kgf, 200 kgf, 400 kgf, 600 kgf, and 800 kgf with the axial load $F_a$ set at 200 kgf. Also, as well as changing the values for the radial loads $F_r$, the contact angles $\alpha_1$ the axially loaded ball bearing 4 are changed in six steps, the respective bell bearings 4, 5 are made the same as for the case of the calculations results of Table 1.

TABLE 2

| $\alpha_1$ | Fr/Fa | | | | | | |
|---|---|---|---|---|---|---|---|
| (degrees) | 0.25 | 0.33 | 0.5 | 1 | 2 | 3 | 4 |
| 30 | 1.02 | 1.02 | 1.03 | 1.15 | 1.38 | 1.4 | 1.33 |
| 40 | 1.06 | 1.06 | 1.12 | 1.51 | 1.68 | 1.52 | 1.36 |
| 45 | 1.08 | 1.11 | 1.24 | 1.75 | 1.8 | 1.54 | 1.36 |
| 50 | 1.14 | 1.21 | 1.46 | 2.05 | 1.89 | 1.55 | 1.37 |
| 55 | 1.24 | 1.4 | 1.82 | 2.38 | 1.99 | 1.61 | 1.42 |
| 60 | 1.45 | 1.73 | 2.31 | 2.75 | 2.11 | 1.73 | 1.52 |

$\alpha_1$: Load-side contact angle

As is clear from Table 2, when the contact angle $\alpha_1$ of the axially loaded ball bearing 4 exceeds 40 degrees, then by making the contact angle $\alpha_2$ of the non axially loaded ball bearing 5 small (15 degrees), then the life extension effect is remarkable, while when this contact angle $\alpha_1$ is 45 degrees, the life extension effect is even greater.

As is also clear from Table 2, if the contact angle $\alpha_1$ of the axially loaded ball bearing 4 is increased to 60 degrees, then the life from a calculation point of view is increased. However adopting such a large contact angle is undesirable from another standpoint. That is to say, when the rolling bearing unit to which the present invention is addressed, is assembled for example into a screw compressor, then due for example to poor fit at the time of assembly, or to deflection of the rotating shaft 2, the central axis of the inner ring 7 can become inclined to the central axis of the outer ring 8. When in such a case a large contact angle of 60 degrees is adopted, then there is a tendency for balls 6 to ride up on the shoulder of the inner ring raceway and the outer ring raceway. If this occurs, then the rolling surface of the balls 6 can be appreciably damaged, thus Considerably marring the life of the rolling bearing unit. Therefore, the upper limit value for the contact angle $\alpha_1$ is preferably kept to around 55 degrees.

Moreover, the contact angle $\alpha_2$ of the non axially loaded ball bearing 5 is preferably made small (close to zero degrees) so as to minimize the internal axial load produced in the second ball bearing 5 when the radial rigidity of the second ball bearing 5 is increased and the second ball bearing 5 takes the radial load $F_r$.

However, due to temperature conditions of the part on which the rolling bearing unit is mounted, end to the conditions for engagement with the rotating shaft 2 and with the housing 3, then if a certain size contact angle (above 15 degrees) is not set, it may not be possible to ensure stable operation. Therefore, taking these conditions into consideration, the contact angle $\alpha_2$ of the second ball bearing or non axially loaded ball bearing 5 is preferably selected to be within the range from 15 degrees to 20 degrees.

In the abovementioned embodiment, the present invention is applied to constructions wherein the pair of ball bearings 4, 5 ere positioned back-to-back. However, the present invention is not limited to the back-to-back assembly and can also be effected in relation to a front-to-front assembly (double front assembly (DF)). Whether to adopt the back-to-back assembly or the front-to-front assembly is determined depending on the required functions for the rolling bearing unit.

That is to say, in cases requiring an increase in rigidity with respect to the bending moment of the rotating shaft 2, then the back-to-back assembly is adopted. On the other hand, in cases where it is necessary to minimize the drop in life of the rolling bearing unit due to the bending moment, then the front-to-front assembly is adopted. A tandem arrangement assembly is outside of the scope of the present invention. However, in order to support a greater load, then the present invention can be freely effected in a so called multi-row assembly bearing, with back-to-back assembly or front-to-front assembly rolling bearing units assembled in groups in the axial direction.

Due to the construction and operation of the present invention as described above, a reduction in internal axial load produced due to radial loading can be achieved while sufficiently maintaining load capacity with respect to external axial loading. Moreover, it is also possible to sufficiently maintain the radial load life of the ball bearing which does not support the axial load. As a result, a sufficient improvement in the life of the overall rolling bearing unit is achieved.

What is claimed is:

1. A rolling bearing unit comprising a shaft having an outer peripheral face, a housing having an inner peripheral face and a pair of first and second, angular type ball bearings provided between the outer peripheral face of the shaft and the inner peripheral face of the housing and having inner and outer rings respectively, the first ball bearing having a first contact angle, the second ball bearing having a second contact angle which is different in direction and amount from the first contact angle, the first ball bearing supporting an axial load applied from outside in a predetermined direction between the shaft end the housing during operation, the inner rings securely fitted onto the outer peripheral face of the shaft, the outer rings securely fitted into the inner peripheral face of the housing, the contact angle of the first ball bearing being larger than the contact angle of the second ball bearing, and the second ball bearing adapted to have a small amount of positive gap produced inside during operation.

2. The rolling bearing unit of claim 1, wherein the contact angle of the first ball bearing is set in a range from 40 degrees to 55 degrees while the contact angle of the second ball bearing is set in a range from 15 degrees to 20 degrees.

3. The rolling bearing unit of claim 2, wherein the first and second ball bearings are the same to each other in ball diameter and number.

4. The rolling bearing unit of claim 1, wherein the first and second ball bearings are the same to each other in ball diameter and number.

5. A rolling bearing unit comprising a shaft having an outer peripheral face, a housing having an inner peripheral face, at least one first angular type ball bearing provided between the outer peripheral face of the shaft and the inner peripheral face of the housing and having inner and outer rings, and at least one second angular type ball bearing juxtaposed with the at least one first angular type ball bearing between the outer peripheral face of the shaft and the inner peripheral face of the housing and having inner and outer rings, the first ball bearing having a first contact angle, the second ball bearing having a second contact angle which is different in direction and amount from the first contact angle, the first ball bearing supporting an axial load applied from outside in a predetermined direction between the shaft and the housing during operation, the inner rings securely fitted onto the outer peripheral face of the shaft, the outer rings securely fitted into the inner peripheral face of the housing, the contact angle of the first ball bearing being larger than the contact angle of the second ball bearing, and the second ball bearing adapted to have a small amount of positive gap produced inside during operation.

6. The rolling bearing unit of claim 5, wherein a plurality of first angular type ball bearings ere provided and faced in the same direction.

7. The rolling bearing unit of claim 5, wherein a plurality of second angular type ball bearings are provided and faced in the same direction.

8. The rolling bearing unit of claim 5, wherein a plurality of first angular type ball bearings are provided and faced in the same direction while a plurality of second angular type ball bearings are provided and faced in the same direction.

9. The rolling bearing unit of claim 5, wherein the contact angle of the first ball bearing is set in a range from 40 degrees to 55 degrees while the contact angle of the second ball bearing is set in a range from 15 degrees to 20 degrees.

* * * * *